United States Patent [19]

Matic

[11] Patent Number: 5,650,835
[45] Date of Patent: Jul. 22, 1997

[54] RECONFIGURABLE OPTICAL BEAM SPLITTER AND METHOD

[75] Inventor: Roy M. Matic, Newbury Park, Calif.

[73] Assignee: Hughes Electronics, Los Angeles, Calif.

[21] Appl. No.: 116,430

[22] Filed: Sep. 3, 1993

[51] Int. Cl.$^6$ .................................. G02F 1/29; G02F 1/13
[52] U.S. Cl. ........................ 349/201; 349/202; 359/573; 359/900
[58] Field of Search .............................. 359/93, 94, 95, 359/618, 573, 569, 571, 575, 298, 315, 316, 320, 900; 349/201, 202

[56] References Cited

U.S. PATENT DOCUMENTS

| | | | |
|---|---|---|---|
| 3,843,231 | 10/1974 | Borel et al. | 350/160 |
| 4,639,091 | 1/1987 | Huignard et al. | 350/347 |
| 4,937,539 | 6/1990 | Grinberg et al. | 330/4.3 |
| 4,958,914 | 9/1990 | Owechko et al. | 359/94 |
| 5,048,935 | 9/1991 | Efron et al. | 359/36 |
| 5,126,869 | 6/1992 | Lipchak et al. | 359/94 |
| 5,150,241 | 9/1992 | Joffre et al. | 359/95 |

FOREIGN PATENT DOCUMENTS

| | | | |
|---|---|---|---|
| 0074144 | 3/1983 | European Pat. Off. | |
| 0363084 | 4/1990 | European Pat. Off. | |
| 2254057 | 7/1975 | France | |
| 4-134418 | 5/1992 | Japan | 359/95 |
| 8705125 | 8/1987 | WIPO | |

OTHER PUBLICATIONS

Dammann et al., "Coherent optical generation and inspection of two-dimensional periodic structures", *Optica Acta*, vol. 24, No. 4, 1977, pp. 505–515.

Killat et al., "Binary Phase Gratings for Star Couplers with High Splitting Ratio", *Fiber and Integrated Optics*, vol. 4, No. 2, 1982, pp. 159–167.

Numerical Algorithms Group (NAG), *NAG Fortran Library Manual —Mark 12*, vol. 3, 1987, pp. 1–20.

Gill et al., *Practical Optimization*, Academic Press, 1981 pp. 115–125.

Tangonan, "Variable Grating Mode Liquid Crystals for Fibre–Optic Application", *Electronics Letters*, 1 Aug. 1985, vol. 21, No. 16, pp. 701–702.

Hori et al., "Field–Controllable Liquid–Crystal Phase Grating", *IEEE Transactions on Electron Devices*, vol. ED–26, No. 11, Nov. 1979, pp. 1734–1737.

*Primary Examiner*—William L. Sikes
*Assistant Examiner*—Tai V. Duong
*Attorney, Agent, or Firm*—Vijayalakshmi Duraiswamy; Wanda K. Denson-Low

[57] ABSTRACT

A reconfigurable optical beam splitter and method establishes replicated periods of optical phase shift regions across a liquid crystal cell to form an optical grating in the liquid crystal. A non-linear pattern of phase shift regions is established within each period of the grating to split an input beam into a multi-beam output, or to combine multiple input beams into a single output beam. The desired pattern of phase shift regions is established by applying corresponding voltage differentials across the cell, between an electrode array on one side of the cell and a common counter electrode on the other side. The voltage differential pattern can be dynamically changed to impart a corresponding dynamic reconfiguration of the output beam pattern. The most efficient voltage differential pattern for any particular output is established by initially selecting a tentative voltage differential pattern, determining the optical efficiency of the processing method with the tentative pattern, and then applying a non-linear optimization algorithm to derive a voltage differential pattern that corresponds to a maximum optical efficiency.

1 Claim, 8 Drawing Sheets

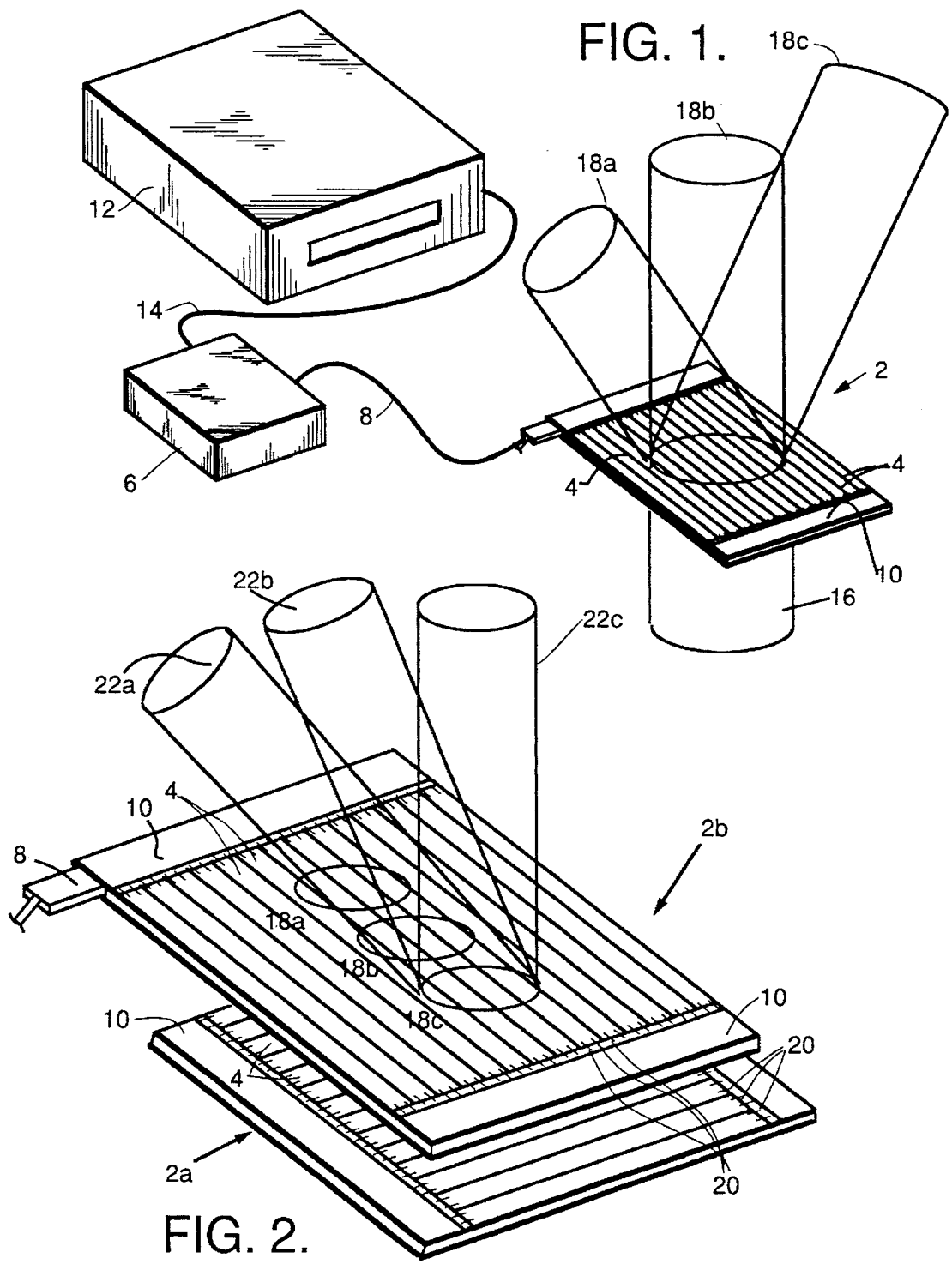

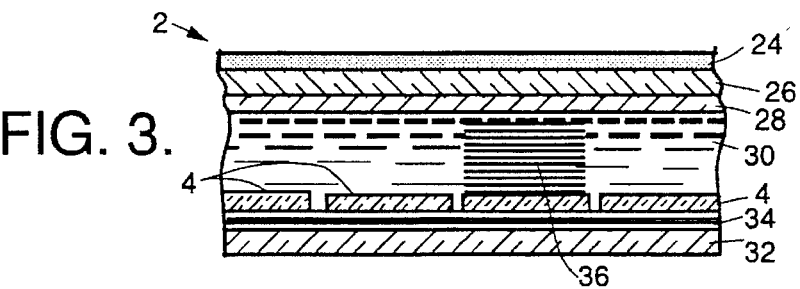
FIG. 3.
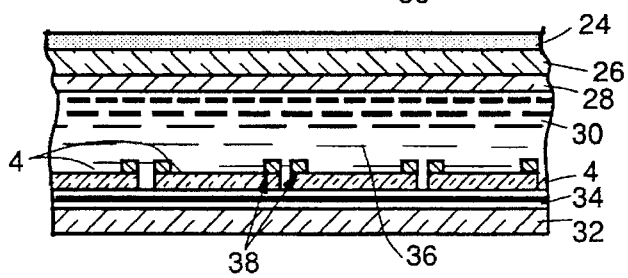
FIG. 4.
FIG. 5a.
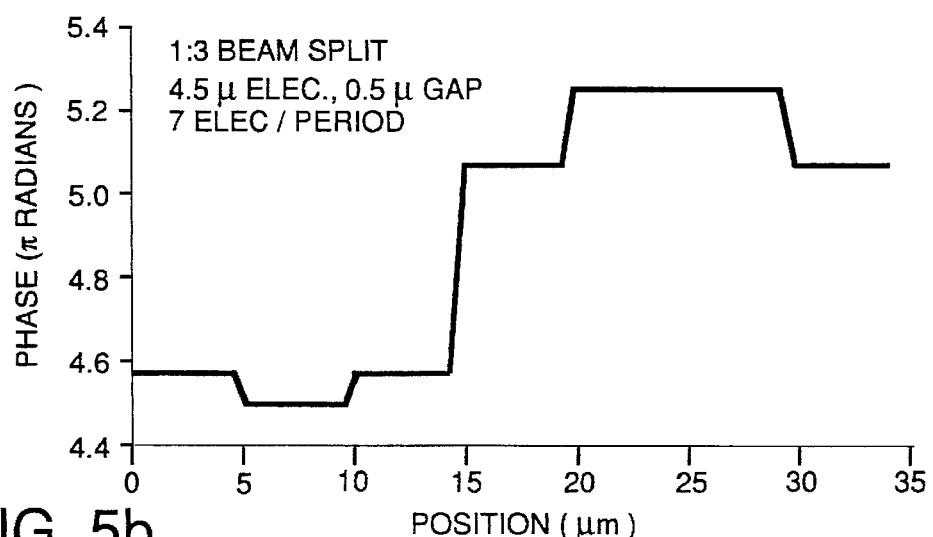
FIG. 5b.
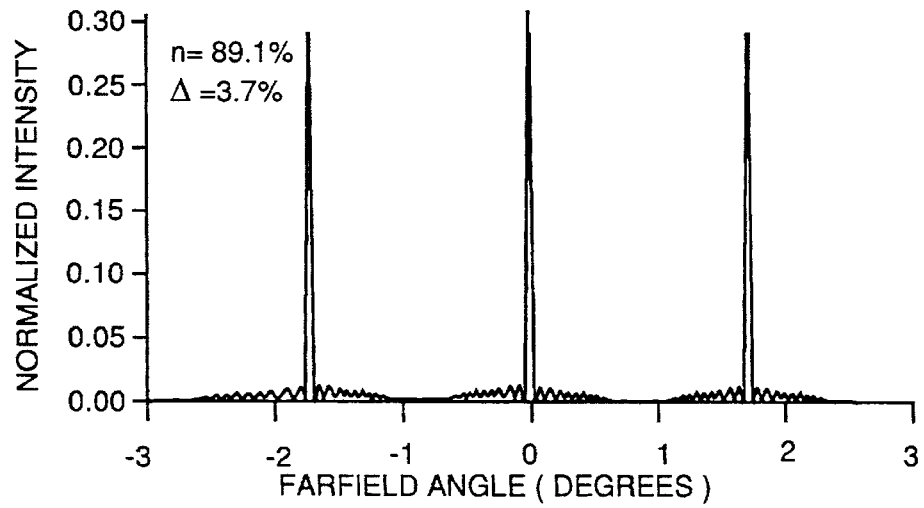

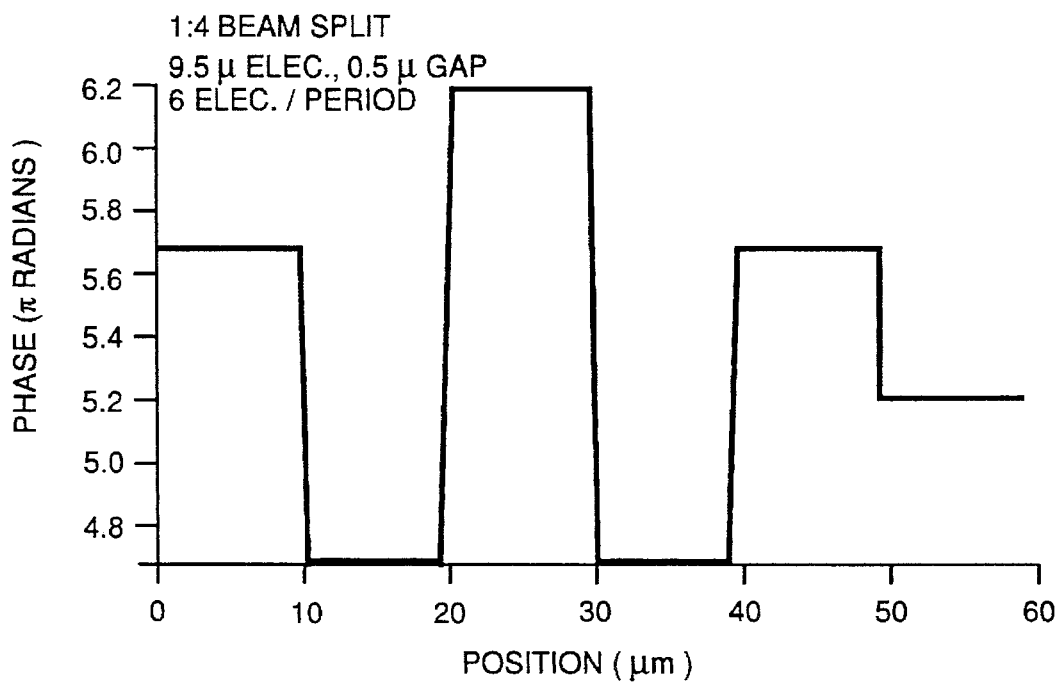
FIG. 6a.
FIG. 6b.
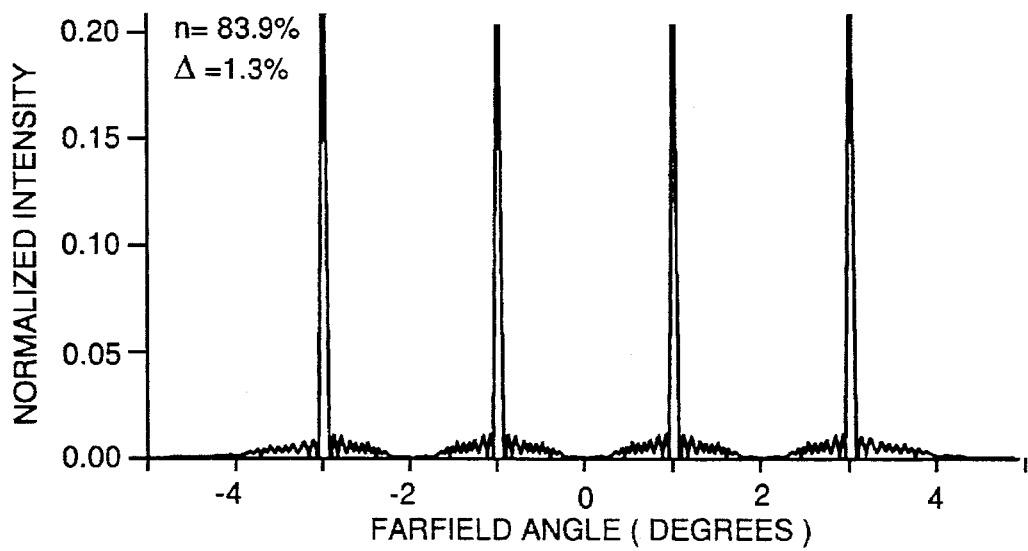

1:7 BEAM SPLIT, -5° DEFLECTION
9.5 μ ELEC., 0.5 μ GAP
15 ELEC. / PERIOD

RECONFIGURABLE OPTICAL BEAM SPLITTER AND METHOD

BACKGROUND OF THE INVENTION

1. Field of the Invention

This invention relates to the division of an input optical beam into an array of multiple output beams, or the reverse process in which multiple input beams are combined into a single output beam, and more particularly to such a beam reconfiguration that is accomplished by controlling an electrode array in a liquid crystal cell.

2. Description of the Related Art

With the emergence of fiber optic communications and the extensive use of optical links in general, there is a need for systems that can manipulate optical signals with a greater degree of flexibility and adaptability than has previously been available (the term "optical" as used herein includes infrared, ultraviolet and other regions of the electromagnetic spectrum, and is not limited to visible light). One optical processing function that is of particular interest for the present invention is a star coupler, in which light from one input beam is distributed to multiple output beams that diverge from each other, or multiple converging input beams are combined into a single output beam. Optical beam division and combination have previously been performed by stationary or mobile mirrors with complete or partial reflectivity, refractive or holographic lenses, prisms and fixed grating rulings. For example, periodic mechanical structures in the form of grooves, multi-pinhole masks and faults in periodic structures are employed for beam splitting in Dammann et al., "Coherent optical generation and inspection of two-dimensional periodic structures", *Optica Acta*, Vol. 24, No. 4, 1977, pages 505–515, while a binary phase grating with arbitrarily shaped grooves to implement a star coupler is described in Killat et al., "Binary Phase Gratings for Star Couplers with High Splitting Ratio", *Fiber and Integrated Optics*, Vol. 4, No. 2, 1982, pages 159–167. Such opto-mechanical devices are bulky and sluggish, and are designed to operate on a fixed number of optical beams at fixed prescribed angles and spacings. Major structural modifications are required to reconfigure the systems to handle beams with different angles of incidence and transmission.

Dynamic control over beam processing has been achieved with the use of multiple electrode systems in a liquid crystal cell. However, these systems have been limited to deflecting a single input beam into a single beam output. While the angle of deflection can be dynamically varied, an incident beam is not divided into multiple outputs, nor are multiple converging inputs combined into a single output. Such systems are described in U.S. Pat. No. 4,937,539 to Grinberg et al., assigned to Hughes Aircraft Company, the assignee of the present invention, and also in U.S. Pat. No. 4,639,091 to Huignard et al. In these systems an optical phase grating is established in the liquid crystal cell by dividing the cell into multi-electrode periods, and applying similar voltage gradients to the electrodes within each period. Thus, the voltage on the electrode at one end of each period will be an a minimum level, the voltage on the electrode at the opposite end of each period will be at a maximum level, and the voltages on the intermediate electrodes progressively ramp up between the minimum and maximum values. This produces an optical grating that allows the input beam to be steered in accordance with the slope of the voltage ramp across each period. However, these patents are limited to beam deflection, and do not include beam splitting or combining.

If an attempt were made to divide the aperture of the above patents into a number of subapertures, with each sub-aperture deflecting its portion of the incident beam in a different direction from the other subapertures, the beamwidth of each output beam would be determined by the size of its associated subaperture. A disadvantage of this approach is that, as the number of apertures increases, the size of each subaperture decreases and the beamwidth of the output beams increases by diffraction.

SUMMARY OF THE INVENTION

The present invention seeks to provide a reconfigurable optical beam splitter and method that allows for the dynamic control over a beam splitting or combining operation, such that the number of output beams into which an input beam is divided (or the number of input beams that are combined into a single output) can be easily adjusted simply by varying the electrical control signals applied to the system, without requiring any structural modifications. A high degree of diffraction efficiency and output beam quality and uniformity is also sought.

These goals are accomplished by using a liquid crystal cell with an electrode array to impose a periodic phase shift pattern upon an optical beam, selecting the phase shift pattern to produce a desired splitting of the beam, and dynamically varying the phase shift pattern to produce a corresponding dynamic variation in the beam split. The invention is applicable to both the division of a single input beam into multiple outputs, and the combination of multiple input beams into a single output, and the term "beam splitting" as used herein refers to either process interchangeably. The invention is also applicable to other beam manipulations such as focusing.

The periodic phase shift pattern establishes an optical grating with a non-linear phase variation within each grating period. The preferred embodiment for implementing the phase shift pattern is a multi-electrode liquid crystal cell, similar to that described in U.S. Pat. No. 4,937,539, but with voltages applied to each of the electrodes to establish the desired non-linear phase variation. The beam splitter can be designed for either reflective or transmissive modes of operation, and two beam splitters can be cascaded with each other along orthogonal axes to produce a two-dimensional output beam array. The beam splitting feature of the invention can also be superimposed upon a beam deflection taught by the prior art.

To arrive at the optimum voltage differential pattern for the cell electrodes, a tentative voltage differential pattern is first selected, and the system's optical efficiency is determined with this pattern. A non-linear optimization algorithm is then applied to derive a voltage differential pattern that corresponds to a maximum optical efficiency.

These and other features and advantages of the invention will be apparent to those skilled in the art from the following detailed description, taken together with the accompanying drawings.

BRIEF DESCRIPTION OF THE DRAWINGS

FIG. 1 is a perspective view of an optical beam splitter in accordance with the invention;

FIG. 2 is an exploded perspective view of an embodiment of the invention which achieves two-dimensional beam splitting;

FIG. 3 is a fragmentary sectional view of a liquid crystal cell used to establish an optical beam splitting grating, with electrodes that produce uniformphase modulation;

FIG. 4 is a fragmentary sectional view similar to FIG. 3, but with electrodes that produce blazed phase modulation;

FIGS. 5a, 5b–9a, 9b are phase distribution and farfield intensity pattern diagrams for the splitting of an input beam into 3, 4, 7, 8 and 11 output beams, respectively;

FIG. 10a is a graph relating the change in refractive index of a liquid crystal as a function of applied voltage, while

DETAILED DESCRIPTION OF THE INVENTION

Figure 7A:
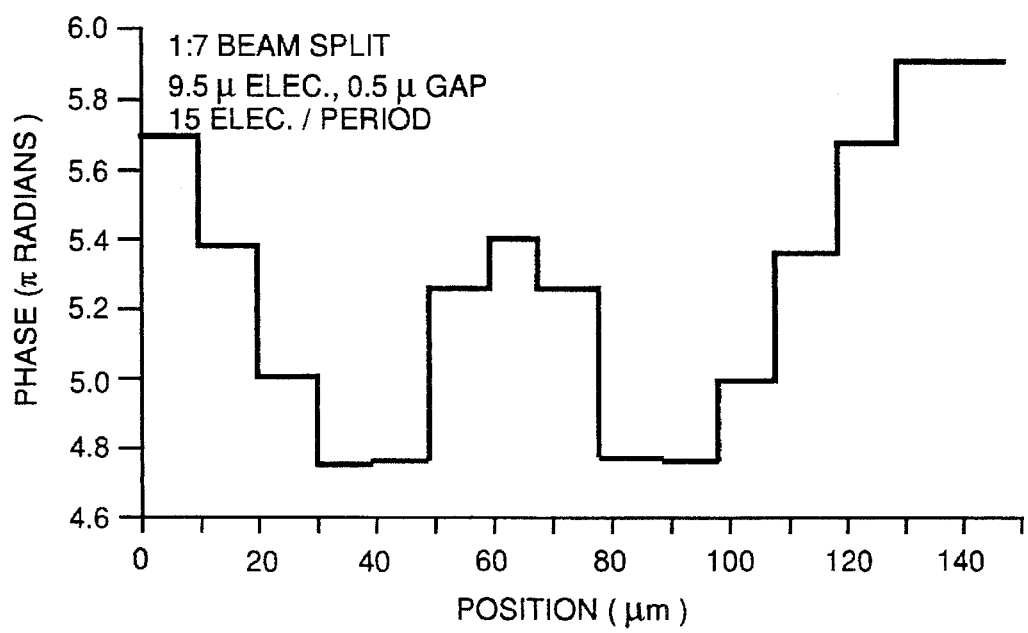
Figure 7B:
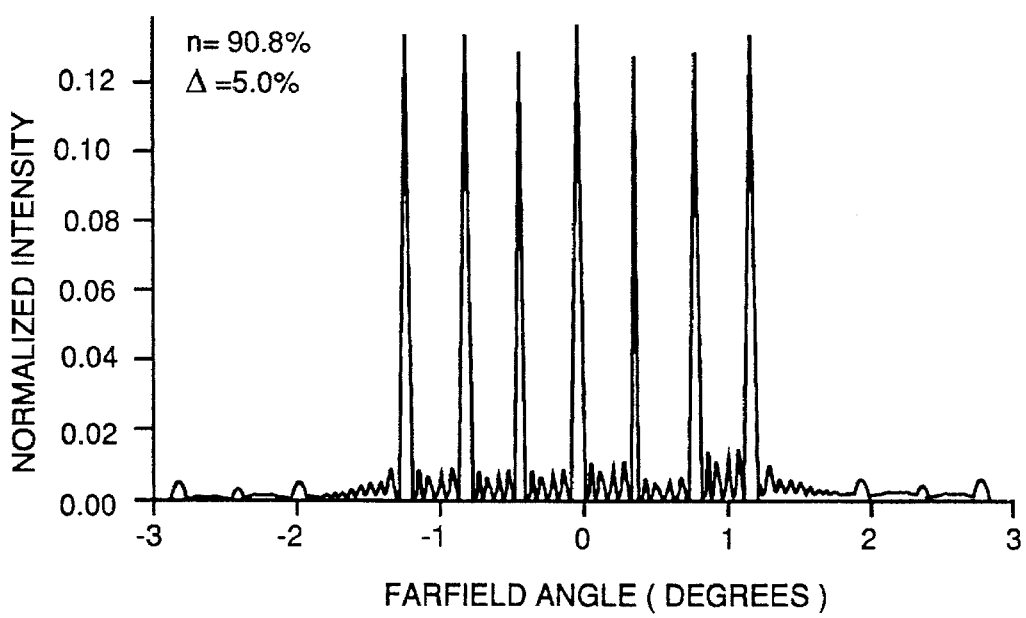
Figure 8A:
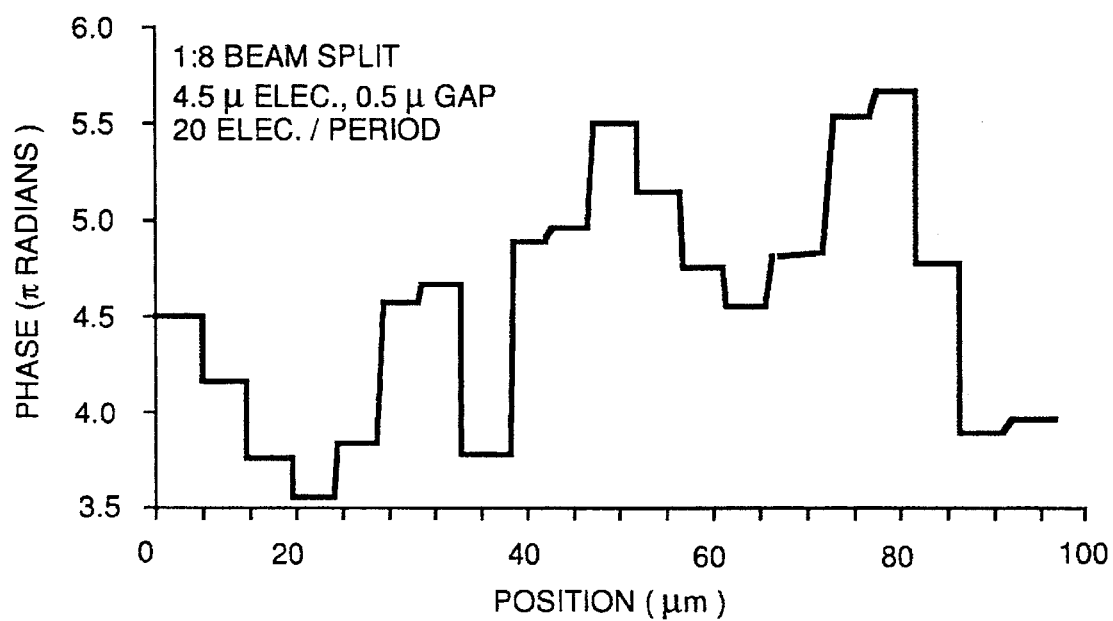
Figure 8B:
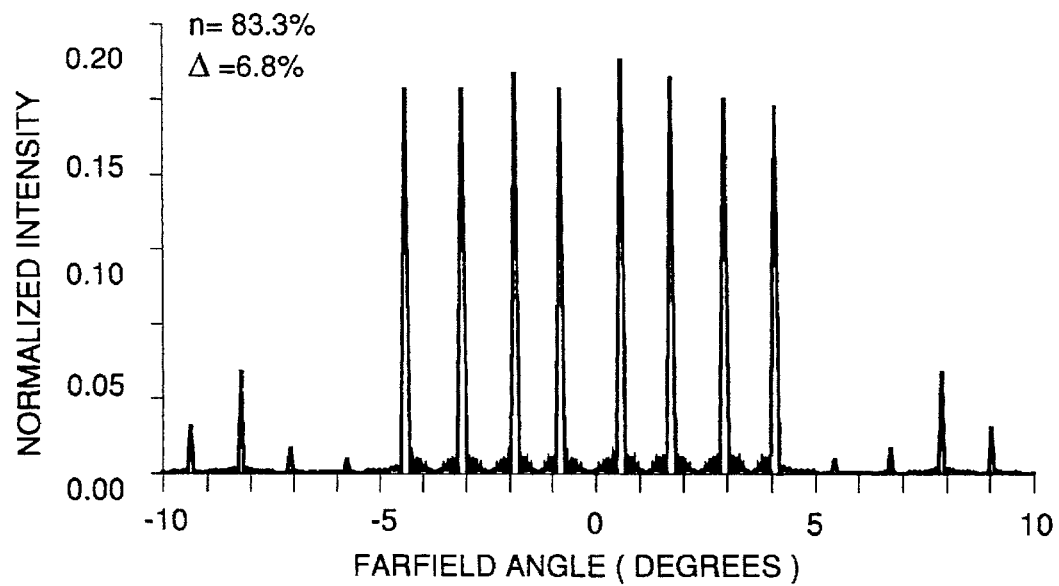

An overall system that can be used to implement the invention is shown in FIG. 1. It includes a beam splitter device 2 in the form of a liquid crystal cell with an array of strip electrodes 4 that are electrically controlled to split an input beam into multiple output beams (or to combine multiple input beams into a single output). Dynamic control over the beam splitting operation is provided by a remote control system 6 that is connected by cabling 8 to control electronics and logic 10 located adjacent the electrodes 4. A computer 12 may be used to provide programmed control inputs to the control system 6 through a cable 14.

Electrical signals are applied from the control electronics and logic 10, governed by the remote control system 6, to the individual electrodes 4 to establish a periodic grating in the liquid crystal cell. In accordance with the invention, the different voltages applied to the various electrodes within each grating period, and also the number of electrodes within each period, are selected to produce a desired splitting of an input beam 16 into a plurality of output beams 18a, 18b and 18c (or a combining of multiple converting input beams 18a, 18b and 18c into a single output beam 16 in the reverse direction). The number and distribution of the output beams 18a–18c can be dynamically controlled and varied by varying the signals from the remote control system 6. (The divergence between beams 18a–18c is somewhat exaggerated in FIG. 1 for clarity.)

The beam splitter of FIG. 1 produces a one-dimensional spread of output beams, along an axis orthogonal to the electrodes 4. A two-dimensional output beam array can be obtained by cascading a pair of beam splitters 2a and 2b, with the two beam splitters oriented along different (preferably orthogonal) axes. This type of arrangement is illustrated in FIG. 2, which also shows the cabling 20 that is used to connect the control electronics and logic sections 10 to the electrodes 4 of each beam splitter. An input beam applied to the first beam splitter 2a is divided into multiple output beams 18a, 18b and 18c, which are shown incident on the downstream beam splitter 2b. Since the electrodes (and the associated grating) of beam splitter 2b are rotated 90° with respect to beam splitter 2a, the beams 18a–18c reach splitter 2b along an axis parallel to the electrodes of splitter 2b. Each of these three beams is then again divided by splitter 2b along an orthogonal axis, at right angles to the electrodes of splitter 2b. Thus, output beam 18c from the first splitter 2a is divided into three further beams 22a, 22b and 22c. Although not shown in FIG. 2, the other output beams 18a and 18b from the first beam splitter are similarly split into three subbeams each, resulting in a 3×3 output array from the downstream beam splitter 2b. Depending upon the voltage patterns applied to the two beam splitters, a different number of output beams could be produced. Furthermore, different patterns of voltages could be applied to the electrodes of each beam splitter so that splitter 2b divides each incident beam into a different number of output beams than splitter 2a.

The entire aperture of the beam splitter is employed as a single phase grating. Each structural period of the phase grating is independently electronically controlled, permitting an adjustment of the optical phase across the entire aperture and a temporal subdivision of the entire input beam. An advantage of this approach is that the beam widths of the output beams is determined by the size of the whole aperture, regardless of the number of output beams. Potential disadvantages are that the input energy may be diffracted into undesired directions by the beam splitter, and that the direction of the output beams for any particular grating pattern is fixed and symmetrical about the grating's zero order (defined as the output beam direction that would occur in the absence of the grating or direction that would occur if the phase throughout the device were uniform). The invention's ability to dynamically alter the nature of the grating by electronic controls, without any structural modifications to the system, mitigates these disadvantages while retaining the benefits of a full aperture for each output beam. Furthermore, the directions of the output beams are symmetrical about the grating's zero order only when the beam splitting is not combined with a beam deflection. When a beam deflection is also present, as discussed below, the output beam pattern can be non-symmetrical about the zero order.

The internal structure of the liquid crystal cell 2 in one embodiment is illustrated in FIG. 3. Only a relatively small number of electrodes are shown, but this structure would be replicated across substantially the full width of the cell. It is generally similar to the cell structure described in U.S. Pat. No. 4,639,091, the contents of which are incorporated herein by reference, although the '091 patent is limited to deflecting an input beam into a single output beam at discrete deflection angles, without dividing an input beam into multiple output beams as contemplated by the present invention.

An antireflection coating 24 is deposited on a transparent cover section 26, such as glass, silicon or germanium. A transparent counter electrode sheet 28, preferably indium tin oxide (ITO), is positioned on the inner cover surface. A layer of nematic liquid crystal 30 is retained between the counter electrode 28 and a substrate 32. An optional dielectric mirror 34 is provided over the substrate if the beam splitter is to be operated in a reflection mode; for a transmission mode of operation the dielectric mirror 34 would be deleted. Substrate 32 would be formed from a material that is transparent to the wavelength of interest for a transmission mode, such as silicon for a 1.06 micron wavelength, but it can be formed from an opaque material for a reflective mode. The electrode strips 4, which are also preferably ITO, are placed over the substrate 32 (or the dielectric mirror 34, if present), on the opposite side of the liquid crystal layer from counter electrode 28. When suitably biased, the counter electrode 28 and electrodes 4 locally change the index of refraction of the liquid crystal layer 30 in the region over each electrode, as indicated by hatching 36. With a common bias applied along the full area of counter electrode 28, an individual bias is applied to each of the electrodes 4 within each period of the grating. This establishes a different index of refraction in the liquid crystal over each different electrode of the period; the portion of the liquid crystal over each electrode can thus be considered a modulator section. This change in the index of refraction in turn locally shifts the phase of an input beam that enters the cell from the top, traverses the liquid crystal layer, and is then either transmitted out through the transparent substrate 32 (in a transmission mode), or is reflected back off the dielectric mirror 34 in a second pass through the liquid crystal (in a reflection mode).

By properly selecting the voltages at each electrode, the phase of each modulator element can be controlled so that they collectively cooperate to perform beam division or combination. In addition, the beam division or combination can be superimposed upon a beam deflection performed in accordance with the prior patents mentioned above.

The electrodes of FIG. 3 may be referred to as a "piston" configuration, since the liquid crystal refractive index is generally uniform over the width of each individual electrode, with step shifts in refractive index from modulator to modulator. An alternate configuration for the liquid crystal cell is illustrated in FIG. 4. This configuration is similar to the cell structure described in U.S. Pat. No. 4,937,539, the contents of which are incorporated herein by reference. The structure is generally similar to that shown in FIG. 3, but instead of applying bias signals directly to the electrodes 4, a pair of bus bars 38 preferably aluminum extend along the opposite sides of the upper surfaces of each electrode 4. The bus bars 38, rather than the electrodes 4, are addressed by the drive electronics 10 (not shown in FIG. 4) to produce voltage gradients across the ITO electrodes 4, which in turn generate linear voltage gradients across the liquid crystal region immediately above each electrode. This linear voltage gradient produces a linear phase gradient ("blaze") across the modulator. The '539 patent also describes electronics that can be used to apply bias voltages to the electrode array, although in this patent the voltage patterns are limited to an approximation of a linear phase ramp, which produce beam deflection but not splitting.

A non-linear optimization technique is preferably employed to determine the optimum electrode voltage pattern for any given number of output beams from a single input beam. Unlike the patents mentioned above, in which the voltage increases generally linearly from electrode to electrode within each period, with the present invention the voltage can either increase or decrease from one electrode to the next, and by differing amounts, depending upon the desired output pattern; the number of electrodes included within each period of the grating is also variable. For a given number of desired output beams N, an arbitrary set of voltages are assumed for the electrodes. The farfield optical pattern that results from this voltage pattern is then calculated, using conventional Fourier Transform techniques, based upon the phase shift produced in each modulator element of the liquid crystal cell. For a given liquid crystal type and thickness, a unique voltagephase relationship can be established for a specific optical wavelength. Assuming that the phase across each electrode is constant (as in FIG. 3) and ignoring the gaps between electrodes, a closed form expression for the farfield intensity pattern can be derived. To determine the optimum values for the individual phase shifts (corresponding to the individual electrode voltages), an iterative search technique is used to calculate and minimize the differences between the desired output and the actual output obtained with the arbitrary set of electrode voltages. This can be expressed as a minimization of the following merit function:

$$C = \sum_{j=1}^{N} (Ipk - Ij)^2$$

where Ipk is the total intensity of the output beams for an ideal beam divider, N is the number of output beams, and Ij is the intensity of the jth output beam from the grating. By separately comparing the value of each output beam with the ideal value for the merit function, the phase values associated with the electrode voltages are optimized to maximize the total energy that is diffracted into the output beams, and to minimize the intensity differences between the beams.

The specific optimization technique that is used in the preferred embodiment is the optimization subroutine E04KBF developed by the Numerical Algorithms Group (NAG), and published in the *NAG Fortran Library Manual–Mark 12*, Vol. *3, 1987*, pages 1–20. The subroutine employed is a comprehensive quasi-Newton algorithm that is used to find an unconstrained minimum of a function of several variables. A general reference for quasi-Newton algorithms is Gill et al., *Practical Optimization*, Academic Press, 1981, pages 115–125.

Since there is a fixed relationship between the electrode voltages and the modulator element phase shifts for a given liquid crystal type and thickness and a given wavelength, the above algorithm can be implemented using either voltage or phase values. In this respect, voltage and phase can be considered to be equivalent, differing only by a constant multiplier factor.

Using the above mathematical technique, designs have been developed for beam splitters with two, three, four, five, six, seven, eight and eleven output beams. One set of designs assumed electrode strips that were 4.5 microns wide with 0.5 micron gaps between electrodes, while a second set of designs assumed electrode strips that were 9.5 microns wide, again separated by 0.5 micron gaps. The simulated performance of these devices is summarized in Table 1 and compared with the ideal case, in which the gap between electrodes is assumed to be zero. The calculated performances compared favorably with the performance of binary and multi-level phase gratings described in the Dammann et al. and Killat et al. articles described above.

In Table 1, n is the diffraction efficiency, defined as the energy in the desired output beams divided by the input beam energy, and Δ is the maximum variation in the intensity of the output beams. The results were obtained for an optical wavelength of 1.06 microns, an active aperture of 1 mm, and a positive nematic BDH-E7 liquid crystal layer 8.0 µm thick for the 4.5 µm wide electrodes and 10.0 µm thick for the 9.5 µm wide electrodes. For a fixed number of output beams, it can be seen that the diffraction energy increases and the maximum variation in intensity between output beams decreases as the number of electrodes per period increases. This is believed to occur because the number of degrees of freedom is increased (i.e., there are more phase shifts per period to optimize) as the number of modulator elements is increased.

It is easier to design an electrode grating for an odd number of output beams because a grating with an even number of output beams must suppress the even diffracted orders, while a grating with an odd number of output beams can use all the central orders. For example, a grating with four output beams must maximize and equalize the power in the −3, −1, +1 and +3 diffracted orders, and suppress the power in all the even orders.

To determine the performance of a "real" device as summarized in Table 1, phase values were determined from the algorithm described above to establish the electrode voltages. The actual phase pattern and its resulting farfield intensity pattern were then computer modeled, assuming a linear voltage drop in the gap regions between electrodes. In general, the gaps between electrodes cause degradation of the device performance.

Figure 9A:
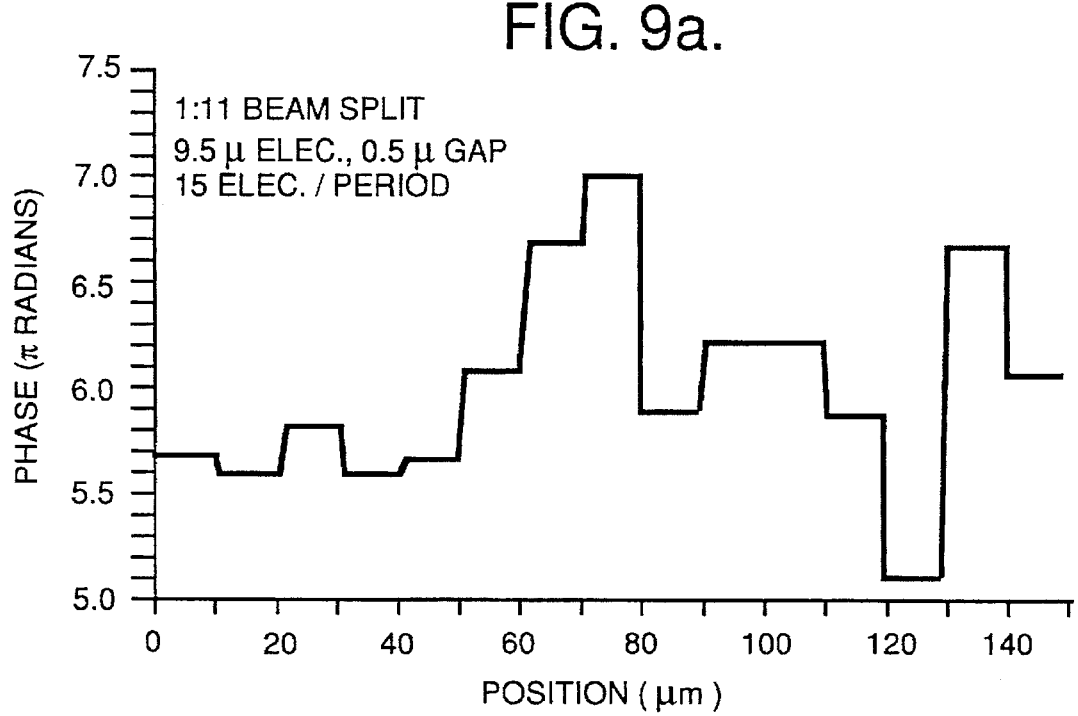
Figure 9B:
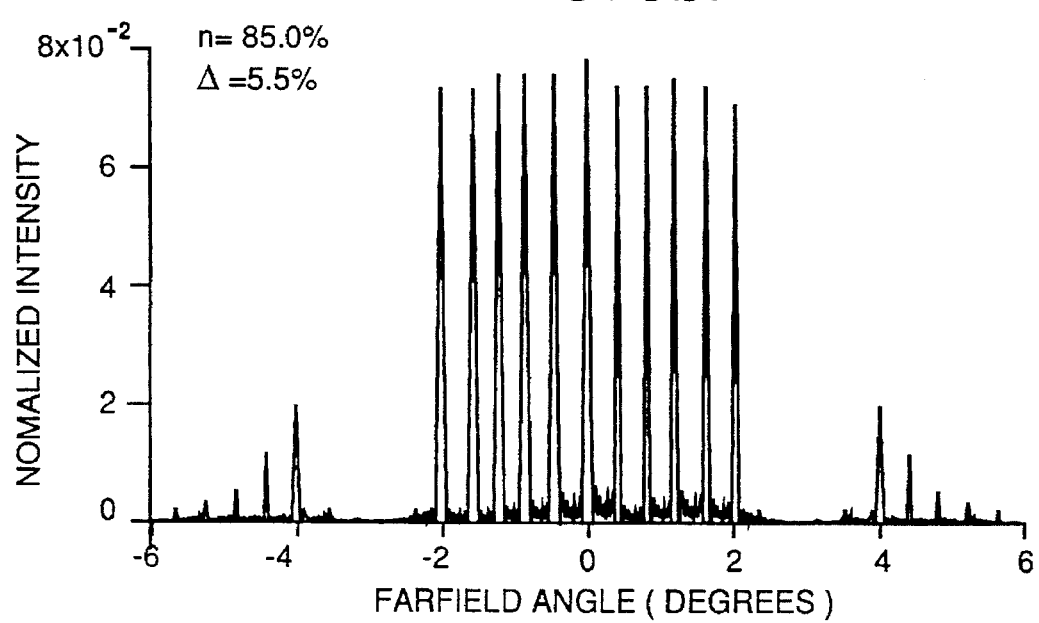

FIGS. 5a–9a respectively show the liquid crystal phase patterns that have been developed to produce 1:3, 1:4, 1:7, 1:8 and 1:11 beam splits for an input beam with a wavelength of 1.06 microns and the liquid crystal layer described above, while FIGS. 5b–9b show the resulting farfield intensity patterns. The electrode and gap widths and the number of electrodes per replicated period are indicated in FIGS. 5a–9a, while the resulting diffraction efficiency n and maximum output intensity variation Δ are indicated in FIGS. 5b–9b. The blazed electrode configuration tends to perform better, with a higher diffraction efficiency and a lower maximum intensity variation; this is believed to result from the larger number of degrees of freedom or parameters to optimize than in the piston configuration (the blazed configuration allows for a selection of two voltages per electrode, as opposed to only one in the piston configuration).

Figure 10A:
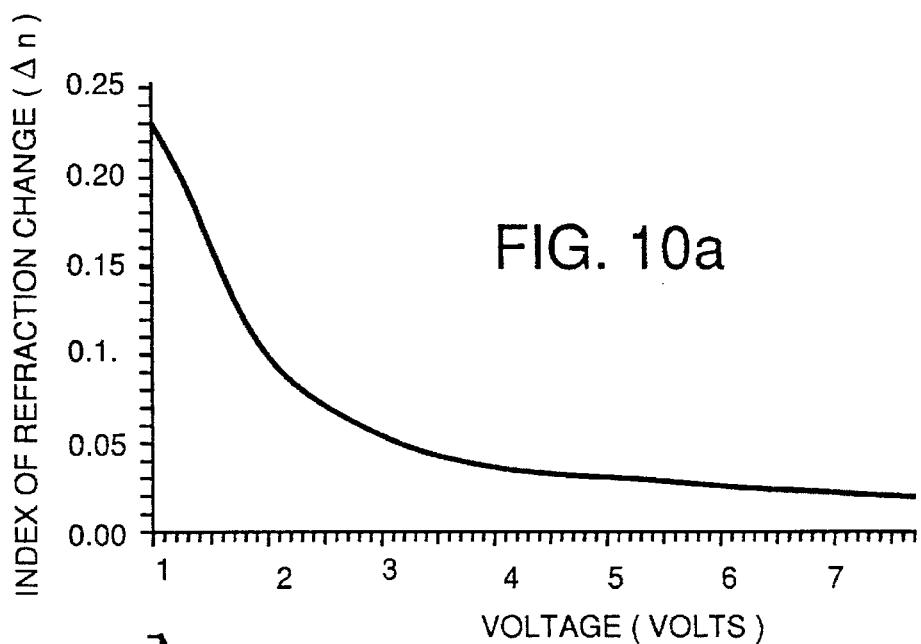
Figure 10B:
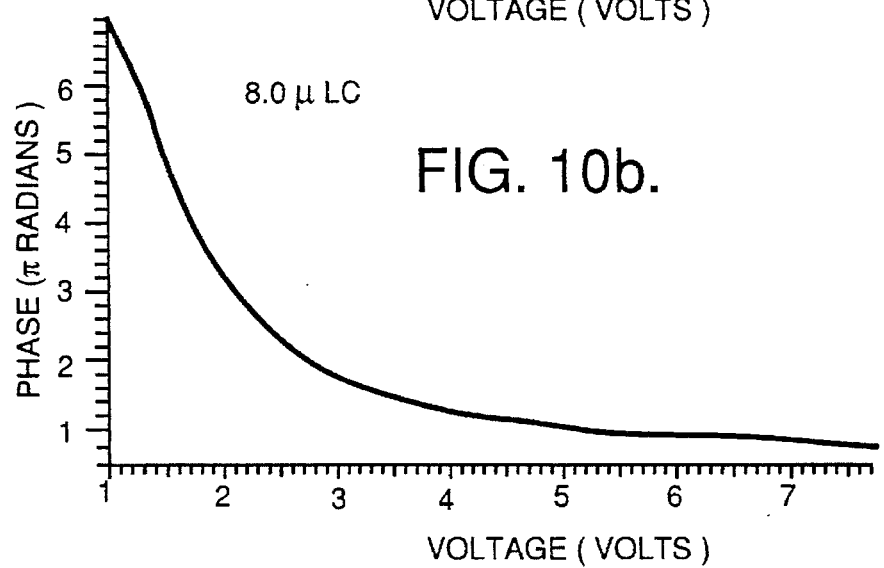
FIGS. 10b and 10c are voltage-phase shift curves showing the electrode voltages necessary to produce the phase distribution patterns of FIGS. 5a–9a for liquid crystal cells of 8 μm and 10 μm thicknesses, respectively.
Figure 10C:
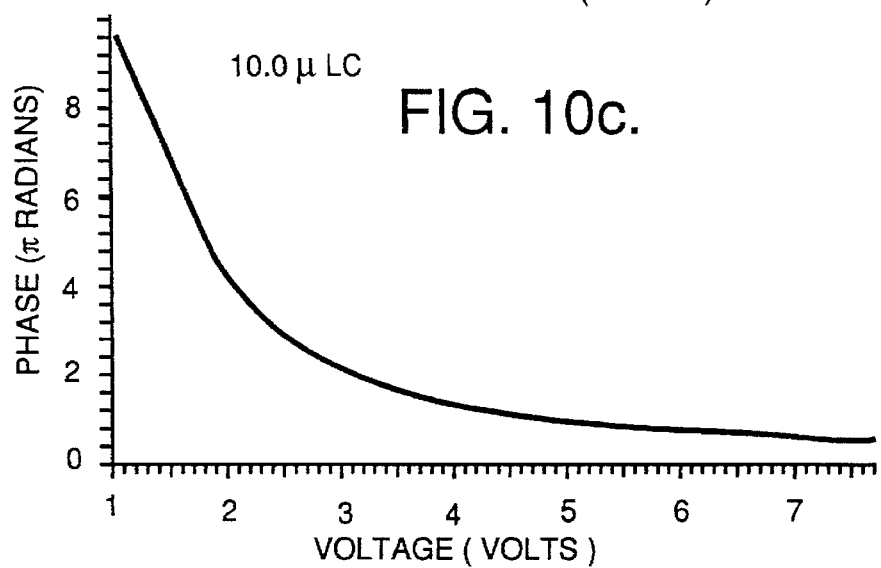

For a given liquid crystal type and thickness, and a given optical wavelength, a relationship can be developed between the phase shift imparted by the liquid crystal modulator element and the voltage differential between that electrode and the counter electrode needed to produce the phase shift. Once this relationship is known, the electrode voltages that are necessary to produce any desired phase pattern, such as those illustrated in FIGS. 5a–9a, can be easily established. The phase-voltage correlation can be entered into a look-up table in the computer that controls the beam splitter system for ready access. A graph showing the change in the index of refraction for BDH-E7 liquid crystal is given in FIG. 10a, while graphs of the phase-voltage relationship for liquid crystal thicknesses of 8 μm and 10 μm are provided in FIGS. 10b and 10c respectively.

Figure 11A:
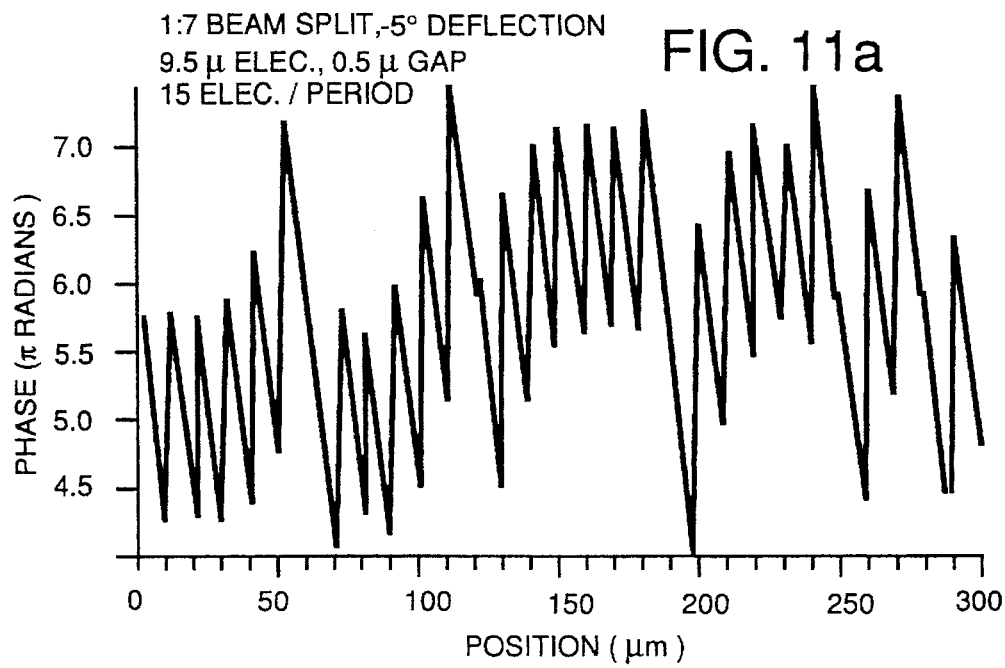
FIGS. 11a and 11b are phase distribution and farfield intensity pattern diagrams for the splitting of an input beam into seven output beams, superimposed upon an output angular deflection.
Figure 11B:
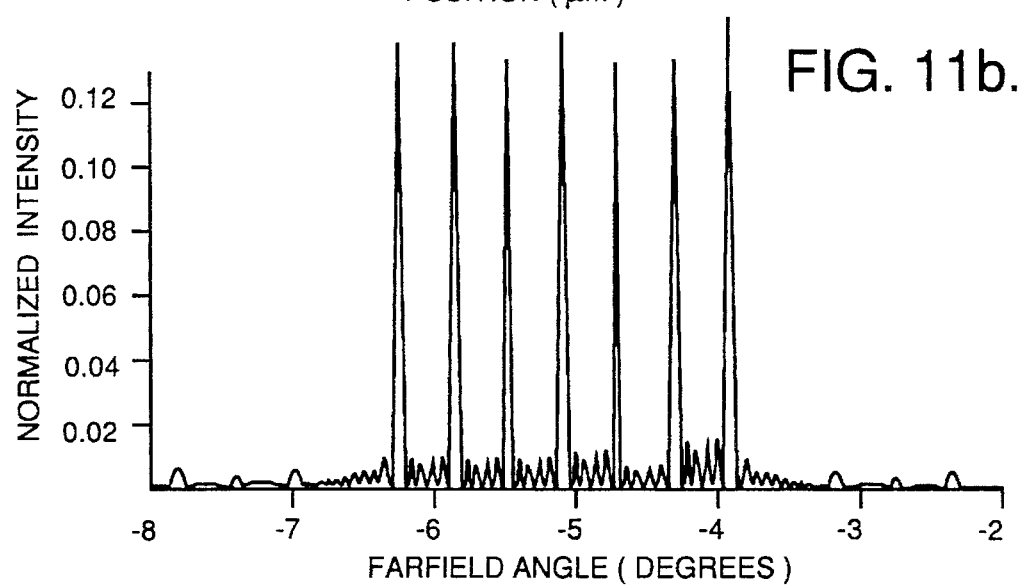

As mentioned previously, the beam splitting capability of the present invention can be superimposed onto a beam deflection taught by the prior art. For example, electrode voltages to produce any of the phase patterns of FIGS. 5a–9a could be superimposed upon the blazed approximation of a linear phase ramp taught by U.S. Pat. No. 4,937, 539. Such a superimposed phase pattern, with the 1:7 beam splitting grating of FIG. 7a added to a −5° deflection grating, is shown in FIG. 11a; two periods of 9.5 micron wide electrodes with fifteen electrodes per period are included in the figure. The resulting multi-beam farfield pattern, which is centered upon an angular deflection of −5°, is shown in FIG. 11b, along with the diffraction efficiency and maximum intensity variation.

Figure 12:
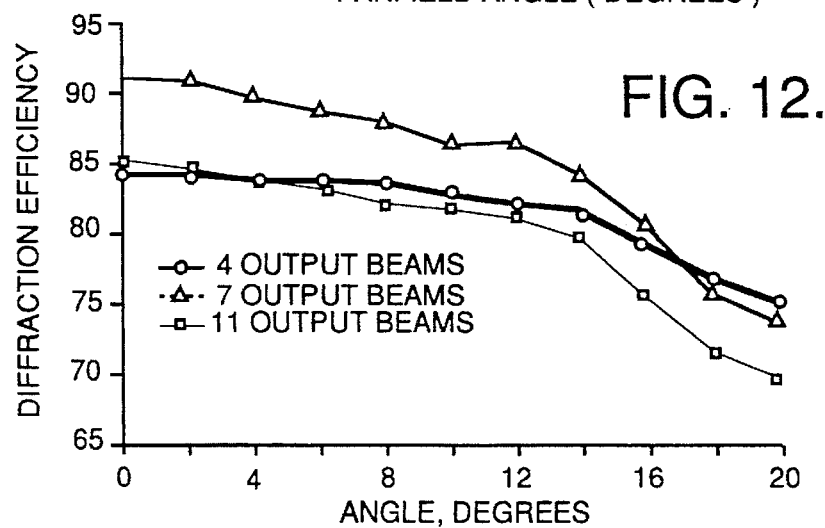
FIG. 12 is a graph of the diffraction efficiency as a function of the output deflection angle for different numbers of output beams.

Similar phase modulation patterns were developed for deflection angles ranging from 0°–20°, with 1:4, 1:7 and 1:11 beam splits. The resulting diffraction efficiencies are plotted in FIG. 12. In general, the diffraction efficiency tends to drop as the deflection angle increases. Either the piston or the blazed configurations can be used, with the blazed configuration tending to perform better for large deflection angles and small wavelengths. In general, the diffraction efficiency decreases, while the maximum intensity variation increases, as the output scan angle goes up.

The beam splitter described herein can be used as a high performance device for either dividing or combining beams, with a high diffraction efficiency and low intensity variation between output beams. The output beam pattern can be non-symmetric, non-mechanically steered to any angle within a deflection angle range, and reconfigured in milliseconds in terms of the number or position of output beams. These unique capabilities, which cannot be achieved with fixed phase gratings, makes the device ideally suited for applications such as configurable local area networks or optical interconnects. The ability to electrically control and dynamically vary the phase pattern enables the device to be used for other applications than beam dividing or combining, such as a cylindrical lens with an electrically controlled or time-varying focal length; in this regard, focusing can be considered as a form of beam splitting.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

TABLE 1

| OUTPUT BEAMS | ELECTRODES/ PERIOD | IDEAL | | CALCULATED 4.5μ ELECTRODES 0.5μ GAP | | CALCULATED 9.5μ ELECTRODES 0.5μ GAP | |
| --- | --- | --- | --- | --- | --- | --- | --- |
| | | n (%) | Δ (%) | n (%) | Δ (%) | n (%) | Δ (%) |
| 2 | 2 | 81.1 | 0.0 | 80.7 | 0.0 | 81.0 | 0.0 |
| 3 | 3 | 77.1 | 7.0 | 73.3 | 3.8 | 75.1 | 1.6 |
| | 5 | 85.3 | 3.7 | 86.3 | 5.5 | 85.8 | 4.6 |
| | 7 | 88.5 | 2.7 | 89.1 | 3.7 | 85.8 | 5.1 |
| | 15 | 91.7 | 1.7 | 89.0 | 2.6 | 90.3 | 2.2 |
| 4 | 6 | 85.9 | 1.0 | 81.9 | 3.4 | 83.9 | 1.3 |
| 5 | 5 | 75.2 | 9.5 | 74.8 | 21.7 | 75.0 | 14.6 |
| | 6 | 82.2 | 4.2 | 82.9 | 11.6 | 82.5 | 7.7 |
| | 7 | 86.3 | 1.6 | 86.5 | 3.1 | 83.6 | 3.7 |
| | 15 | 90.2 | 4.0 | 88.3 | 2.5 | 89.2 | 2.7 |
| 6 | 10 | 82.0 | 3.0 | 79.9 | 2.9 | 81.5 | 2.0 |
| | 14 | 77.0 | 6.9 | 75.8 | 12.1 | 76.4 | 9.5 |
| 7 | 7 | 74.7 | 13.3 | 73.6 | 27.1 | 74.1 | 17.9 |
| | 9 | 83.7 | 2.9 | 84.0 | 10.7 | 83.9 | 6.1 |
| | 10 | 86.4 | 4.3 | 83.9 | 10.2 | 84.0 | 5.4 |
| | 11 | 87.5 | 1.1 | 86.6 | 7.0 | 86.1 | 3.1 |
| | 15 | 90.0 | 0.9 | 92.3 | 3.2 | 90.8 | 5.0 |
| 8 | 20 | 82.2 | 5.5 | 83.3 | 6.8 | 81.7 | 7.15 |
| 11 | 15 | 85.2 | 2.5 | 84.8 | 8.6 | 85.0 | 5.5 |
| | 17 | 99.3 | 2.4 | 87.6 | 14.8 | 87.9 | 8.2 |

I claim:

1. A beam processing method, comprising:

imposing a non-linear periodic phase shift pattern upon an input optical beam, at least a portion of said phase shift pattern establishing a phase shift substantially greater than Π2, wherein said periodic phase shift pattern comprises an optical grating with a non-linear phase variation within each grating period, selecting said phase shift pattern to produce a desired alteration of said beam, and dynamically varying said phase shift pattern to produce a corresponding dynamic variation in the alteration of said input beam, wherein said phase shift pattern is selected to split said input beam into multiple output beams, and wherein a substantially linear phase variation is superimposed upon the non-linear phase variation within each grating period to superimpose a beam deflection onto said beam split.

* * * * *